United States Patent [19]

Lyons, Sr.

[11] 3,762,805
[45] Oct. 2, 1973

[54] PRESSURE MEANS FOR USE WITH EYEGLASS FRAMES

[76] Inventor: Thomas J. Lyons, Sr., 1232 Superior Ave., Pittsburgh, Pa. 15212

[22] Filed: Sept. 8, 1971

[21] Appl. No.: 178,564

Related U.S. Application Data

[63] Continuation of Ser. No. 816,220, April 15, 1969, Pat. No. 3,654,376.

[52] U.S. Cl.................. 351/113, 351/114, 351/121
[51] Int. Cl.............................................. G02c 5/16
[58] Field of Search................... 351/111, 113, 114, 351/121, 123

[56] References Cited
UNITED STATES PATENTS 2,684,014 7/1954 Fairly................................. 351/113
2,087,502 7/1937 Chylack............................. 351/113

FOREIGN PATENTS OR APPLICATIONS 1,185,072 2/1959 France.............................. 351/113

Primary Examiner—David Schonberg
Assistant Examiner—Paul A. Sacher
Attorney—Donn J. Smith

[57] ABSTRACT

Pressure means for use in combination with eyeglass frames including a frame front, a pair of temples, and hinge means connecting said temples to said frame front, comprise a body member shaped to fit snugly and removably over at least one of the temples and surrounding at least a portion thereof, elongated resilient means supported by the body member on the outward side thereof and of the temple and extending forwardly thereof. The resilient means are shaped in avoidance of the adjacent front corner of the temple to bearingly engage the adjacent end portion of the frame front only when the temple is near its fully opened position such that pressure is exerted on the temple urging the temple from its fully opened position toward its closed position and against the head of the user.

8 Claims, 9 Drawing Figures

PATENTED OCT 2 1973 3,762,805
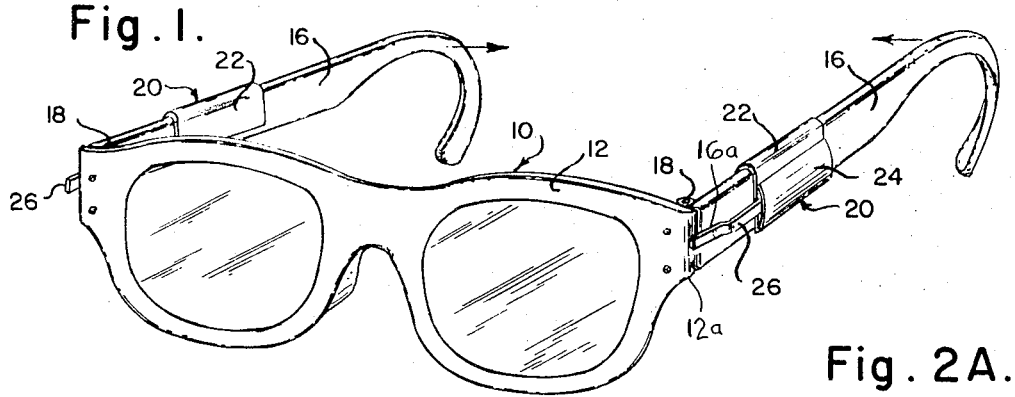
Fig. 1.
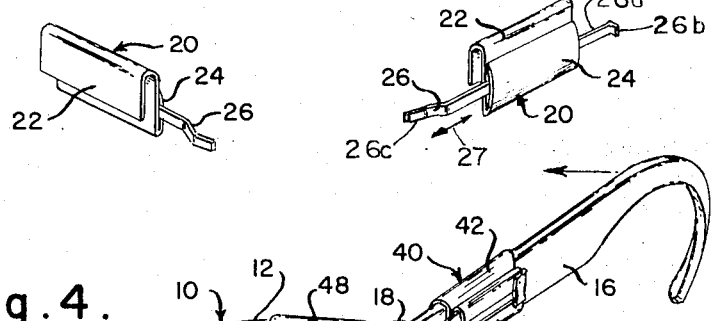
Fig. 2. Fig. 2A.
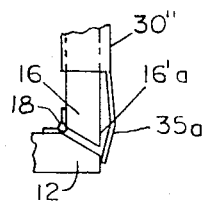
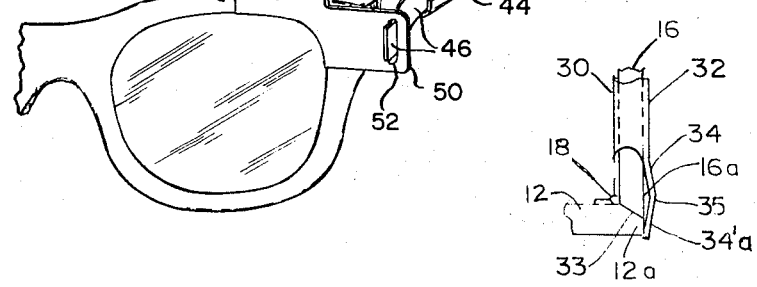
Fig. 4. Fig. 3A.
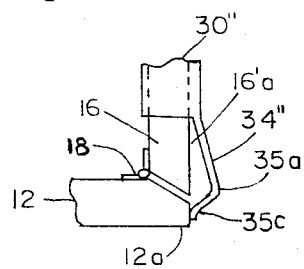
Fig. 5.
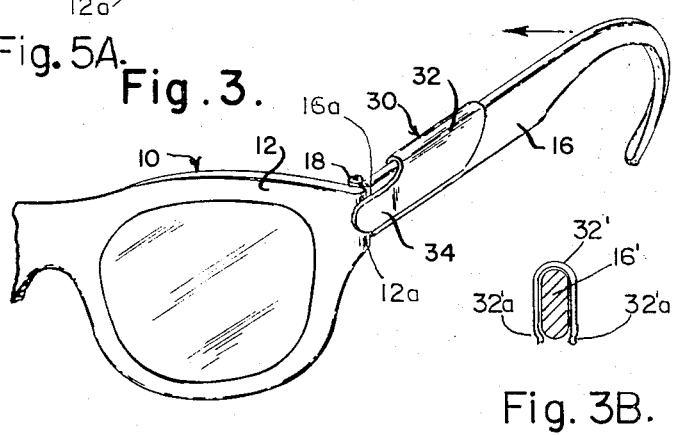
Fig. 5A. Fig. 3. Fig. 3B.
INVENTOR
Thomas J. Lyons, Sr.
HIS ATTORNEY

PRESSURE MEANS FOR USE WITH EYEGLASS FRAMES

This application is a continuation of my copending application entitled PRESSURE MEANS FOR USE WITH EYEGLASS FRAMES filed Apr. 15, 1969, Ser. No. 816,220, now U.S. Pat. No. 3,654,376.

This invention relates to a device for use with eyeglass frames to maintain the frames securely on the heads of the users.

A common annoyance with ordinary eyeglass frames is that, after a prolonged period of use, the frames slip part way along the nose of the user. This is caused by a bowing of the temples away from the head or spreading of the temples because of loosening of the screws holding the hinge between the temples and the frame front. The temples may be reshaped and the hinge screw tightened in order to restore the proper holding power of the frames. But, it will be a matter of a short wearing period until the temples will again bow or the hinge screw loosen and the frames will again slip down the nose of the user.

Attempts have been made to correct the slipping problem of the eyeglass frames. These attempts involve pressure means for exerting a pressure on the temples of the frame so as to urge the temples inwardly and against the head of the user to thereby maintain the frames in their proper position at all times. The pressure means used heretofore are made integral with the frames as typified by the means disclosed in U.S. Pat. Nos. 2,550,348 and 3,001,200. The integral pressure means are most often made in conjunction with the frames themselves; that is, the pressure means and frames are assembled together in the first instance and the user purchases the combination. The integral pressure means are not readily adaptable to existing frames, and, accordingly, the user must buy new frames if he chooses to have frames which will stay in proper position on his head.

I overcome the drawback of integral pressure means, while at the same time retaining the positive features thereof, by providing pressure means which are separate from the frames themselves and can be simply mounted on the temples without any need for permanent attachment. The pressure means of my invention can be placed on or taken off the temples at will without any need for using tools of any sort.

More specifically, I provide, preferably, pressure means for use in combination with eyeglass frames including a frame front, a pair of temples, and hinge means connecting said temples to said frame front, said pressure means comprising a body member shaped to fit snugly and removably over at least one of the temples and surrounding at least a portion thereof, elongated resilient means supported by said body member on the ourward side thereof and of the temple and extending forwardly thereof, said resilient means being shaped in avoidance of the adjacent front corner of the temple to bearingly engage the adjacent end portion of said frame front only when the temple is near its fully opened position such that pressure is exerted on the temple using the temple from its fully opened position toward its closed position and against the head of the user.

Other details and advantages of the invention will become apparent as the following description of certain present preferred embodiments thereof proceeds.

In the accompanying drawings I have shown certain present preferred embodiments of the invention and methods for practicing the same in which:

FIG. 1 is a perspective view of an eyeglass frame showing the pressure means of this invention mounted on the temples of the frame with the temples in the open position and the pressure means exerting a pressure on the temples urging them towards the closed position;

FIG. 2 is a perspective view of the pressure means of FIG. 1 shown separated from the eyeglass frame;

FIG. 3 is a perspective view of part of an eyeglass frame showing another embodiment of the pressure means of this invention;

FIG. 3A is a partial top plan view of the eyeglass frame and pressure means shown in FIG. 3;

FIG. 3B is a cross sectional view of a temple of an eyeglass frame similar to that shown in FIG. 3 but illustrating a modified form of the pressure means;

FIG. 4 is a perspective view of part of an eyeglass frame showing still another embodiment of the pressure means of this invention;

FIG. 5 is a partial top plan view of an eyeglass frame and still another modified form of the pressure means; and FIG. 5A is a similar view of a further modified form of the pressure means.

Referring now to the drawings, and particularly to FIGS. 1 and 2, 10 generally designates an eyeglass frame of well known construction, including a frame front 12 and a pair of temples 16 suitably attached with the frame front by hinge means 18 of any well known design. In their open positions (FIGS. 1, 3, 4) the temples 16 are disposed substantially normally of the frame front 12, as determined by stops surfaces thereof formed adjacent each hinge 18. The pressure means of this invention, as shown in FIGS. 1 and 2, is generally designated 20, and as shown in FIG. 1 can be used with one or both of the temples 16. Each pressure means 20 includes an elongated main body member 22 formed from any suitable metallic or non-metallic resilient material. The main body member 22 has a generally U-shaped configuration suitably sized so that the main body member fits snugly, yet removably, over a forward portion of the temple 16.

By fitting "removably" on temple 16, I means that the pressure means 20 can be easily detached from the temple 16 by hand without the necessity of using any tools. In addition, the size of the pressure means 20 is such that it snugly or firmly grips the temple 16 so as not to slide freely along the length of the temple, unless sufficient manual force is applied.

The outer portion 24 of the main body member 22 is folded toward the bight of the U-shape thereof, and is suitably arranged with respect to the remainder of the main body member for sungly receiving an elongated resilient means, in this case a relatively flat spring member 26. Spring member 26 is disposed to extend forwardly of main body member 22 towards the endpiece of the frame front 12.

The forward end portion of spring member 26 is suitably shaped to curve towards the adjacent end portion 12a of frame front 12 such that the spring member engages the outer surface of the end portion 12a of the frame front when the temple 16 is or near its fully open position. As explained below with reference to FIG. 3 the spring or finger 26 is shaped at 26c for structural strength and avoidance of the outside front corner 16a of the user. Thus, the shape of spring member 26 is such that the engagement just described results in the spring member being placed under tension to thereby exert a pressure on the temple 16 to urge it towards its closed position. The pressure so exerted is sufficient to bias or urge the temples 16 against the user's head and to securely grip the head of the user so that the frame 10 will remain in proper position at all times. The pressure on the temple 16, however, is not so great as to cause discomfort to the user. The shape of the resilient means or spring member 26 is also made so that the temple 16 may be closed or opened without the spring member interferring in any manner whatsoever with movement of the temple relative to the frame front.

The degree of pressure exerted by spring member 26 can be simply adjusted either by suitably positioning the entire pressure means 20 on the temple 16 (e.g., moving the pressure means away from the hinge means 18 would increase the pressure with the spring member 26 having the shape shown in FIGS. 1 and 2) or by leaving main rody member 22 in one position and sliding the spring member relative thereto one way or the other as desired. As better shown in FIG. 2A the spring member can be elongated at 26a and provided with an end-stop 26b, in furtherance of the slidability and adjustment of the spring member 26, by virtue of its intermediate straight section. Sliding the spring member (arrow 27) variably positions the deformed end portion 26c of the spring member relative to the frame end 12a and thus varies the pressure thereon. The rear-end stop 26b and the shaped forward end portion 26c can serve to define the limits respectively of the adjusting sliding movement of the resilient means 26.

Another embodiment of the pressure means of the present invention is shown in FIGS. 3, 3A, and is generally designated 30. Pressure means 30 has an integral elongated main body 32 U-shaped in cross section, and spring member 34, formed from any suitable metallic or non-metallic resilient material. In the illustrated embodiment the spring member 34 is formed integrally with the main body 32. As in the other modifications of the invention, desirably the spring or biasing member 34 is formed or secured at the outward surface of the main body member so as not to interfer with the hinging action of the associated temple 16. As better shown in FIG. 3A the spring member 34 extends forwardly of the temple 16 a sufficient distance to engage end portion 12a of the frame front 12. If desired, and as better shown in FIG. 3B, the depending sides of main body 32' can be extended below the lower edge of the temple 16', and their lower edge portion can be deformed inwardly at 32'a in order to induce a snap action when the main body 32' is placed over the associated temple 16. In any event the main body fits snugly and removably over the temple, but can be adjusted therealong to adjust the positional engagement and resultant tension of its resilient means 34 relative to the end portion 12a of the frame front 12, as in the other embodiment herein.

The shape considerations pertinent to the elements forming the pressure means 20 of FIGS. 1 and 2 are similarly pertinent to those of pressure means 30. That is, main body 32 is shaped to fit snugly, yet removably, over the associated temple 16 while spring member 34 is shaped to engage the endpiece of the frame front 12 when the temple 16 is substantially fully opened such that a pressure is exerted on the temple urging it toward the closed position, the pressure being sufficient to cause the temples to securely grip the head of the user while not being so great as to cause discomfort.

As shown in FIGS. 3 and 3A the spring or biasing member 34 is secured to the outward side of the main body member 32 such that it extends along the outer surface of the temple 16. Preferably the spring member 34 is shaped (FIG. 3A) in avoidance of the front outward corner 16a of the temple 16 such that the temple 16 can be urged inwardly against the head of the user for a short distance from its fully opened position, while bearing contact is maintained between the resilient means 34 and the frame end portion 12a. The fully opened position is determined by engagement of the abutting stop surfaces 33 of the frame front 12 and the temple 16, which also determine the maximum bearing force of contact between the resilient means 34 and the frame end 12a, and thus the reactive force on the temple 16. Owing to slight deformation of the temple 16 and loosening of the hinge 18 during continued usage of the eyeglass frame, a limited displacement of the temple or temples 16 from their fully opened position, by the pressure means 30 is necessary to maintain a slight but essential biasing force against the head of the user in order to maintain the eyeglass frame in place. Thus, the spring member 34 is shaped such that the aforesaid limited movement of the temple 16 can occur without contact between the front temple corner 16a and the spring member 34 that would displace the spring member 34 from its biasing engagement with the end portion 12a.

In furtherance of this purpose the spring member 34 is disposed such that bearing contact with the frame end 12a initially bends the spring member 34 outwardly of the temple 16 and body member 32 at a slight angle thereto as better shown in FIG. 3A. The spring member 34 is provided with a reverse bend at 35 (FIG. 3, 3A) so that its outer or forward end portion 34a is then disposed for direct and bearing engagement with the end portion 12a of the frame front 12.

It will be understood of course that the spring member 34 need not be made integrally with the main body 32. It is also contemplated that the spring member 34 can be made adjustable relative to the body member 32 after the teachings of FIG. 2A or 4 such that the front end portion 34a of the spring member 34 variably engages the end piece portion 12a of the frame front 12. Such variable engagement, however, can be accomplished by displacing the body member 32 slight distances fore and aft of the temple 16, as noted previously. Yet another embodiment of the pressure means of this invention is shown in FIG. 4 and is generally designated 40. Pressure means 40 includes an elongated main body member 42 formed from any suitable resilient metallic or non-metallic material, and having a generally U-shape suitable for snugly, yet removably, fitting over a forward portion of temple 16. The outer portion 44 of main body member 42 has opposite folds formed to define an open end channel for slidably receiving a flat spring member 46. The rear end of spring member 46 is suitably bent over to serve as a stop for the forward movement thereof.

Pressure means 40 also includes saddle-shaped receiver member 48 suitably formed and contoured, as shown in FIG. 4, to snugly, yet removably, fit over the end portion of the frame front without obstructing the eyeglass lens. Receiver member 48 has an end portion 50 extending beyond the endpiece of frame front 12 and having a slot 52 formed therethrough. Slot 52 is suitably sized to snugly receive the free end portion of spring member 46 in the manner shown in FIG. 4. The end portion 50 extends beyond the endpiece of the frame front 12 a sufficient amount such that spring member 46 is made to bend away from the temple 16 resulting in the spring member being placed in tension to thereby exert a pressure on the temple 16 urging it towards its closed position. Thus, the temples 16 will securely grip the head of the user so that the frame will stay in position at all times. The length of end portion 50 and spring characteristics of spring member 46 are suitably selected to regulate the degree of pressure needed to exert the proper holding force on the temples 16 while avoiding undue discomfort to the user.

It is to be noted that the pressure means of any of the disclosed embodiments can be readily modified to incorporate an adjustable spring member, after the teachings of either FIGS. 2A or 4.

As in the other illustrated embodiments of the invention the degree of pressure can also be simply varied by sliding or otherwise positioning the main body member 42 along a length of the temple 16 is desired.

It is noted that the resilient means of the pressure means of this invention (i.e., the spring members 26 and 34 of pressure means 20 and 30, respectively, and spring member 46 and receiver member 48 of pressure means 40) engage the endpiece of the frame front 12 when the temples 16 are "substantially in the fully open position." The resilient means will engage the end pieces actually before the temples are completely fully opened but the engagement will occur considerably more towards the open position of the temples than towards the closed position. It is for sake of clarity of expression that I say that the engagement occurs when the temples are substantially in the fully open position. The expression should not be construed as meaning that the engagement first occurs at complete full opening of the temples, but rather as somewhere near the fully open position.

In the FIG. 5 arrangement the bend 35a is displaced forwardly to permit a somewhat greater range of temple movement before the outside front corner 16'a contacts the resilient means 34' of the body member 30'. In FIG. 5A the bend 35b is sharper and is moved further forwardly, for an even greater range of temple movement under the biasing action of the resilient means 34''. In the latter case the resilient means 34'' can be reverse-bent at 35c to prevent a less gouging contact with the frame front end 12a. The resilient means 26 of FIGS. 1–2A can be similarly formed, if desired.

While I have shown and described certain present preferred embodiments of the invention, it is to be distinctly understood that the invention is not limited thereto but may be otherwise variously embodied within the scope of the following claims.

I claim:

1. Temple tensioning means for use in combination with eyeglass frames including a frame front, a pair of temples, and hinge means connecting said temples to said frame front so that front ends of said temples are positioned generally in back of end portions respectively of said frame front, said tensioning means comprising a body member shaped to fit snugly and removably over at least one of the temples and at least partially surrounding at least a portion thereof, elongated resilient means supported by said body member on the outward side thereof, said resilient means being spaced outwardly from the adjacent outer surfaces of the temple and extending forwardly thereof, said resilient means being shaped in avoidance of the adjacent front end portion of the temple to bearingly engage the adjacent end of said frame front only when the temple is near its fully opened position so that pressure is exerted on the temple urging the temple from its fully opened position toward its closed position and against the head of the user, said body member being spaced along said temple from said frame front adjacent end, and said resilient means bridging the gap between said body member and said adjacent end.

2. The combination according to claim 1 wherein said body member is resilient and is shaped to be slip-fitted over said temple.

3. The combination according to claim 1 wherein stop surfaces are provided on said forward temple end and on said frame front end portion to determine said fully opened position and the maximum force exerted on said temple by said resilient means.

4. The combination according to claim 1 wherein said body member and said resilient means are fabricated integrally.

5. The combination according to claim 2 wherein said body member is generally U-shaped in cross section and is provided with inwardly extending edge surfaces disposed for snap-fitting of said body member over said temple.

6. Pressure means for use in combination with eyeglass frames including a frame front, a pair of temples, and hinge means connecting said temples to said frame front so that front ends of said temples are positioned generally in back of end portions respectively of said frame front, said pressure means comprising a body member shaped to fit snugly and removably over at least one of the temples and at least partially surrounding at least a portion thereof, elongated resilient means supported by said body member on the outward side thereof and of the temple and extending forward thereof, said resilient means being shaped in avoidance of the adjacent front end portion of the temple to bearingly engage the adjacent end of said frame front only when the temple is near its fully opened position so that pressure is exerted on the temple urging the temple from its fully opened position toward its closed position and against the head of the user, said body member and said resilient means being selectively and longitudinally movable with respect to one another, said resilient means being shaped and positioned for continuous but variable bearing engagement with said frame end whereby upon selective longitudinal movement of said resilient means the pressure exerted by said resilient means on said frame end and reactively on said temple is varied.

7. Pressure means for use in combination with eyeglass frames including a frame front, a pair of temples, and hinge means connecting said temples to said frame front so that front ends of said temples are positioned generally in back of end portions respectively of said frame front, said pressure means comprising a body member shaped to fit snugly and removably over at least one of the temples and at least partially surrounding at least a portion thereof, elongated resilient means supported by said body member on the outward side thereof and of the temple and extending forwardly thereof, said resilient means being shaped in avoidance of the adjacent front end portion of the temple to bearingly engage the adjacent end of said frame front only when the temple is near its fully opened position so that pressure is exerted on the temple urging the temple from its fully opened position toward its closed position and against the head of the user, said temple and said body member being shaped for engagement at selective positions along the length of said temple to vary the force of engagement between said frame end and said resilient means.

8. The combination according to claim 7 wherein said resilient means includes an elongated straight section slidably mounted on said body member, and stop means are provided on each end of each resilient means, said stop means defining the range of adjusting movement of said resilient means on said body member.

* * * * *